United States Patent [19]

Gruber et al.

[11] 4,107,386
[45] Aug. 15, 1978

[54] ANAEROBICALLY HARDENING ADHESIVES AND SEALANTS BASED ON (METH)ACRYLIC ESTERS CONTAINING POLYCARBONATES TERMINATED BY (METH)ACRYLIC ESTER GROUPS

[75] Inventors: Werner Gruber, Düsseldorf-Gerresheim; Joachim Galinke, Langenfeld; Bernd Wegemund, Haan, all of Fed. Rep. of Germany

[73] Assignee: Henkel Kommanditgesellschaft auf Aktien, Düsseldorf-Holthausen, Fed. Rep. of Germany

[21] Appl. No.: 770,386

[22] Filed: Feb. 22, 1977

[30] Foreign Application Priority Data

Feb. 27, 1976 [DE] Fed. Rep. of Germany ....... 2607959

[51] Int. Cl.² .............................................. C08L 67/06
[52] U.S. Cl. .................................. 428/412; 260/873; 428/461; 526/314; 528/370
[58] Field of Search .................... 260/873, 76, 859 R; 428/412

[56] References Cited

U.S. PATENT DOCUMENTS

| 3,637,909 | 1/1972 | von Bonin et al. ............. 260/859 R |
| 3,925,322 | 12/1975 | Azuma et al. ................... 260/78.4 E |
| 4,045,514 | 8/1977 | Iwahashi et al. ..................... 260/873 |

*Primary Examiner*—Richard B. Turer
*Attorney, Agent, or Firm*—Hammond & Littell

[57] ABSTRACT

Polycarbonates terminated by (meth)acrylic ester groups are components of anaerobically setting adhesive compositions based on (meth)acrylic esters and organic peroxides.

21 Claims, No Drawings

ANAEROBICALLY HARDENING ADHESIVES AND SEALANTS BASED ON (METH)ACRYLIC ESTERS CONTAINING POLYCARBONATES TERMINATED BY (METH)ACRYLIC ESTER GROUPS

FIELD OF THE INVENTION

The present invention relates to anaerobically hardening adhesives, sealing compounds, etc., based on mixtures of (meth)acrylic esters, which may be optionally substituted, and organic peroxides, particularly hydroperoxides. More specifically, it relates to compositions which harden rapidly in the absence of oxygen, based on (meth)acrylic esters and organic peroxides, particularly hydroperoxides, which are known as anaerobic adhesives, sealing compounds, and the like. They are preferably used in solvent-free form for the above-mentioned purposes. The invention includes methods for the preparation of these compositions.

As essential components these systems contain polycarbonates terminated by (meth)acrylic ester groups. They can additionally contain (meth)acrylic esters of mono- or polyhydroxy alcohols, and organic peroxides or hydroperoxides, as well as small amounts of additional polymerizable compounds, and optionally other auxiliary substances. Very satisfactory results are obtained by using polycarbonates whose average molecular weight is between about 300 and 10,000 as starting materials. To ensure a sufficiently rapid hardening in the absence of oxygen, accelerators are added to the system.

RELATED ART

It is known that methacrylic esters or acrylic esters of various alcohols together with hydroperoxides yield mixtures which harden under exclusion of atmospheric oxygen and which can be used as adhesives and sealing compounds. If (meth)-acrylic esters of cycloaliphatic alcohols are used, considerably high tensile shearing strength values are obtained, which are important, e.g. for fastening shafts.

Furthermore, it is important that these anaerobically hardening adhesives yield firm bonds between the objects to be bonded, even at higher temperatures Another requirement is that the cemented joint have good flexibility. Consequently, anaerobically hardening adhesives and sealing compounds must have a number of beneficial properties which are difficultly reconcilable with each other.

OBJECTS OF THE INVENTION

A principal object of the present invention is the development of an anaerobically hardening adhesive and sealing compound based on methacrylic- or acrylic esters and organic peroxides or hydroperoxides, as well as small amounts of additional polymerizable compounds and optionally other auxiliary substances, containing as an essential component polycarbonates terminated by (meth)acrylic ester groups.

Another object of the present invention is the development of an anaerobically hardening adhesive and sealing compound which polymerizes at room temperature, i.e. which hardens to an adhesvie layer or sealing compound, yielding after a short time a loadable bond which is strong and shows good thermal stability and flexibility, even for nonferrous materials, like aluminum and aluminum alloys.

Another object of the present invention is to provide a method for forming a strong, heat stable and flexible bond from the polymerization of an anaerobically hardening adhesive and sealing compound based on methacrylic- or acrylic esters and organic peroxides or hydroperoxides, as well as small amounts of additional polymerizable compounds and optionally other auxiliary substances, containing as an essential component polycarbonates terminated by (meth)acrylic ester groups.

These and other objects of the invention will become more apparent as the description thereof proceeds.

DESCRIPTION OF THE INVENTION

The present invention relates to novel anaerobically hardening adhesive and sealing compositions comprising (meth) acrylic esters and peroxide polymerization catalysts and as an essential component polycarbonates terminated by (meth)acrylic ester groups. The compositions may contain small amounts of one or more additional polymerizable compounds and other auxiliary substance, if desired, to optimize the properties of the compositions.

A special embodiment of the invention is an anaerobically setting adhesive and sealing composition comprising methacrylic or acrylic acid esters, and organic hydroperoxides, and optionally small amounts of additional, polymerizable, unsaturated compounds and conventional auxiliary additives, which contains 10 to 90% by weight based on the total weight of the polymerizable portions of the composition, of (meth)acrylic acid esters of terminal, hydroxy polycarbonates having at least two terminal hydroxyl groups.

The polycarbonates with terminal hydroxyl groups used in the invention contain diol-derived radicals from aliphatic, cycloaliphatic, and/or oxyaliphatic diols. Glycols containing both alkylene and cycloalkylene residues and those containing oxyalkylene residues are suitable. Examples of the former types are ethylene glycol, 1,3-propanediol, 1,4-butanediol, 1,6-hexanediol, neopentyl glycol and 1,4-dimethylol cyclohexane; examples of the latter type are diethylene glycol, triethylene glycol, tetraethylene glycol, and polyethylene glycol.

Alkylene glycols of 2-8, preferably 2-4, carbon atoms; cycloalkylene glycols of 5-10 carbon atoms, where the OH- may be present in a hydroxyalkyl -group, preferably hydroxymethyl group; and oxyalkylene glycols of the formula $HO-CH_2-CH_2[O-CH_2CH_2]_n-O-CH_2CH_2-OH$ where $n$ is 0 to 6, are appropriate. Cycloalkylene glycols having five- or six- membered rings are preferred. Short-chain diols, like butanediol, are preferred. Likewise, short-chain ether diols, like di- and triethylene glycol, especially triethylen glycol, are preferred. The diols can be used alone or in combination with each other.

The polycarbonates with terminal hydroxyl groups preferably have an average molecular weight between about 300 and 10,000.

In a preferred embodiment of the invention $\alpha, \omega$-bishydroxy polycarbonates are used. An especially useful $\alpha, \omega$-bishydroxy polycarbonate can be prepared using several diols in widely varying mixing ratios to one another, as e.g. triethylene glycol and neopentyl glycol. Thus, very small amounts of a diol(s) can be used in combination with very large amounts of the other(s).

The $\alpha, \omega$-bishydroxy polycarbonates can be prepared according to known methods, e.g. by condensation of the diols with diphenyl carbonate or other readily accessible carbonates.

The esterification or reesterification of these α,ω-bishydroxy polycarbonates with methyl (meth)acrylate in the presence of acid catalysts, like cation exchangers, is effected by azeotropic distillation of the liberated methanol with methyl(meth)acrylate. The alpha-omega-di-(meth)acrylates of polycarbonates thus obtained are liquid substances which are stable in the presence of oxygen at low temperatures.

The above-described polycarbonate di(meth) acrylic esters can be characterized on the basis of known physical methods. They are colorless or yellow-colored substances.

The adhesives and sealing compounds according to the invention can contain up to 90% by weight of the above mentioned polycarbonate di(meth)acrylic esters, based on the total weight of the polymerizable portions of the composition. According to a preferred embodiment, they additionally contain 10 to 40% by weight, based on the total weight of the polymerizable portions of cycloaliphatic, heterocyclic or aliphatic (meth)acrylic esters. These cycloaliphatic, heterocyclic or aliphatic (meth)acrylic esters can optionally contain free OH-groups.

These cycloaliphatic, heterocyclic or aliphatic (meth)acrylic esters as components of anaerobic systems have been known for a long time, They are composed, for example of (meth) acrylic esters of mono- or polyvalent alcohols, such as ethylene glycol; diethylene glycol; triethylene glycol; tetraethylene glycol; polyethylene glycol; glycerin; tri-methylol propane; pentanediol; di-, tri-, or tetrapropylene glycol; or the (meth) acrylic esters of dimerized or polymerized cyclopentadienol, tetrahydrofurfuryl alcohol, cyclopentanol, methylcyclopentanol, cyclohexanol, methylcyclohexanol, 1,3-dioxa-2,2-dimethyl-4-methylol-cyclopentane or 4-methylolcyclohexane. The reaction products of glycidyl ethers of polyvalent phenols with acrylic acid or meth acrylic acid provide another group of anaerobically hardening adhesives. Those (meth) acrylic esters containing free OH-groups have been found to be very useful, as e.g. hydroxyethyl methacrylate, and 2-hydroxypropyl methacrylate. Satisfactory results are aslo obtained with esters produced by reacting (meth)acrylic acid with dimerized cyclopentadiene, i.e., (meth)acrylic acid esters of the isomeric dihydrodicyclopentadienols.

Examples of suitable monomethacrylates are tetrahydrofurfuryl methacrylate, 5,6-dihydroxyclopentadienylmethacrylate, cyclohexyl methacrylate, ethylhexyl methacrylate, hydroxyethyl methacrylate, and hydroxypropyl methacrylate. Examples of suitable dimethacrylates are ethylene glycol dimethacrylate, triethylene glycol dimethacrylate and polyethylene glycol dimethacrylate.

In a preferred embodiment, the compositions of the invention consist of 70-80% of the polycarbonate di(-meth)acrylic ester and 20-30% mono(meth)acrylates, based on the total weight of the polymerizable portions of the composition. A favorable effect on the properties of a cemented joint has also been realized by addition to the mixtures according to the invention of small amounts of polymerizable carboxylic acids containing double bonds, such as alkenoic acids having 3 to 6 carbon atoms, like methacrylic acid, acrylic acid, etc. in an amount of 0.1 to 5% by weight, based on the total weight of the polymerizable portions of the composition. Methacrylic acid has been found to be especially useful.

Another essential component of the anaerobically hardening compositions are the peroxide initiators. These are preferably hydroperoxides which derive from hydrocarbons with a chain length of 3 to 18 C-atoms. Suitable, for example, are cumene hydroperoxide, tert. -butyl hydroperoxide, methyl ethyl ketone hydroperoxide, and diisopropyl benzene hydroperoxide, especially cumene hydroperoxide. Furthermore those peroxides are also suitable which have a half life period of 10 hours at a temperature between 80° C and 140° C. Here we mention particularly tert. -butyl perbenzoate, di-tert. -butyl-diperoxyphthalate, 2,5-dimethyl-2,5-bis-(tert-butylperoxy)-hexane, bis-(1-hydroxycyclohexyl) peroxide, tert-butyl-peroxyacetate, 2,5-dimethyl-hexyl-2,5, -di-(peroxybenzoate), tert. -butylperoxy-isopropyl carbonate, n-butyl-4,4-bis-(tert. -butylperoxy) valerate, 2,2-bis- (tert.-butylperoxy)-butane and di-tert.-butyl peroxide.

The peroxides should be present in an amount of 0.1% to 20%, preferably 1.0% to 10%, based on the total weight of the polymerizable portions of the compositions. They are used mostly as phlegmatized (i.e. thickened) solutions or pastes, that is, with a relatively low content of inert substances, for example, dimethyl phthalate, cumene or the like.

The adhesives may also contain small amounts of auxiliary compounds such as are customarily present in adhesives of this type, such as stabilizers and, if desired, accelerators.

According to a preferred embodiment of the invention, stabilizers are added to the anaerobically hardening mixtures, particularly if they contain arylalkyl- and/or dialkyl hydrazones. The stabilizers prevent premature polymerization; that is, they improve the stability of the compositions during storage. Beyond that, they have an accelerating effect on the polymerization of the (meth)acrylic esters under anaerobic conditions. The stabilizers thus possess a double function. Suitable substances which have these properties are, for example, aliphatic monopercarboxylic acids, preferably the alkyl monopercarboxylic acids with 2-8 carbon atoms in the alkyl radical (particularly peracetic acid) and nitrones, like C-phenyl-N-methyl-nitrone. Aromatic per acids can also be used, such as perbenzoic acid and perphthalic acid. The use of small amounts (e.g., 0.05% to 5.0%, preferably 0.05 to 3%, by weight of the (meth) acrylic esters), is generally sufficient.

In addition to the foregoing, the composition may contain a free radical stabilizer, to prevent gelations when oxygen alone is insufficient for the purpose. Quinones (for example, hydroquinone) are preferred stabilizers for this purpose. These quinone inhibitors can be used in concentrations of 100–1000 ppm, preferably 200–500 ppm, of the polymerizable portions of the compositions.

As a rule, the stabilizers are added as the last ingredient to the composition.

According to a preferred embodiment of the invention accelerators are added to the compositions. Suitable accelerators include organic amines, particularly tertiary amines, carboxylic hydrazides, N,N-dialkyl hydrazines, carboxylic sulfimides, and mercaptans such as octyl mercaptan or dodecyl mercaptan. The accelerators are generally present only in small quantities (approximately 0.1% to 5% by weight of the polymerizable portions of the compositions). In this instance the compositions exhibit their best properties with reference to a fast setting time. As amines aliphatic or aromatic tertiary amines, for example, triethylamine, dimethylaniline, N,N-dimethyl-o-toluidine, N,N-dimethyl-p-toluidine, and tri-n-butylamine, are suitable. The hydrazides of acetic acid and of benzoic acid are examples of suitable hydrazides. Among the sulfimides, benzoic acid sulfimide is preferred.

Among other accelerators useful in the invention may be mentioned aromatic hydrazines, such as 4-nitrophenylhydrazine and 2,4-dinitrophenylhydrazine; hydrazones such as acetophenone hydrazone, benzaldehyde hydrazone, methyl ethyl ketone hydrazone, methyl isobutyl ketone hydrazone, and diacetyl hydrazone, sulfonyl hydrazones such as methyl ethyl ketone tosyl hydrazione, acetone tosylhydrazone, cyclohexanone tosyl hydrazone and acetoacetic ester tosyl hydrazone; organic disulfonamides, more especially diaromatic sulfonamides, such as di-p-tosylsulfonamide; and organic sulfonic acid hydrazides such as benzene-sulfonic acid hydrazide, and p-toluene sulfonic acid hydrzide. In the use of the accelerators mentioned in this paragraph it is helpful to use organic amines, as e.g. N,N-dimethyl-toluidine either as an auxiliary or principal accelerator. In this case the systems show their best properties regarding a rapid hardening time.

A class of particularly effective accelerators are the organic sulfohydrazides, especially the aryl sulfonic acid hydrazides. Preferred among these are benzenesulfonic acid hydrazide and p-toluenesulfonic acid hydrazide, most preferably p-toluenesulfonic acid hydrazide. These sulfohydrazide accelerators display special effectiveness in combination with tertiary amines, preferably N,N-dimethyl-p-toluidine.

The combination of a sulfohydrazide accelerator in combinations with a tertiary amine and peracetic acid as stabilizer is a very appropriate accelerator/stabilizer combination for the instant invention, as e.g. p-toluensulfonic acid hydrazide in combination with N,N-dimethyl-p-toluidine and peracetic acid.

Accelerators and stabilizers must be added in amounts adjusted to each other to obtain optimum properties. They can be easily adapted to each other by simple preliminary tests to obtain an optiumum hardening time and good stability. The components of the adhesive compositions of the present invention including initiators, inhibitors, stabilizers, accelerators and esters, are mutually soluble or homogeneously dispersible.

An example of a preferred embodiment of the anaerobically hardening compositions of the invention consists of a polycarbonate di(meth)acrylic ester; mono- or di(meth)acrylate(s), which can be substituted by free hydroxy group(s); a polymerizable carboxylic acid; and organic peroxide; an accelerator; and a stabilizer.

Furthermore, thickeners, softeners, plasticizers, inorganic fillers, and coloring matter can also be added to the adhesive and sealing compounds according to the invention. Suitable thickening agents are polymeric compounds based on styrene or (meth)-acrylic polymers, such as the ester-soluble poly(lower alkyl)acrylates and methacrylates, as e.g. polymethyl methacrylate and polyethyl acrylate, and ester-soluble polyvinyl hydrocarbons such as polystyrene, as well as polyvinyl chloride, synthetic rubber and the like. They are generally used in amounts sufficient to give the composition a paste-like viscosity.

Among the fillers and colorants may be mentioned, e.g. finely-divided silicon dioxide, silicates, such as calcium silicate, bentonites, calcium carbonate, and titanium dioxide; and soluble dyes in amounts appropriate for the purpose.

The adhesive and sealing compositions according to the invention are produced by mixing the components at room temperature. These compositions have excellent storage stability in air or oxygen. They are stable for months or years if they are kept in vessels that are permeable to air, like polyethylene bottles. They can further be stored in only partly-filled bottles of glass, polyethylene, etc., without undergoing any change, a relatively low oxygen-partial pressure sufficing to inhibit polymerization. The bottles can also be colored to keep out short-wave light, which has a favorable effect on the stability.

The anaerobically-hardening compositions of the present invention are used in the industry for cementing metal sheets or metal parts of different materials, as e.g. for the cementing of screws and bolts in their threads, the sealing of screw-connections, nipples, etc., the cementing of plug connections, the sealing of flanges, the assembly of intriccate metal shapes, sealing pipe joints, etc. Assemblies of metals such as iron, brass, copper and aluminum can be bonded to each other. Small quantities of the adhesive compositions are introduced between the surfaces to be bonded, after which the surfaces are contacted with each other sufficiently firmly or in another manner so as to exclude air or oxygen. Then the compositions of the invention polymerize rapidly forming a firm bond. It is naturally also possible to accelerate the hardening with known means, as, e.g. by heating the joint.

When the adhesvies of the present invention are to be used for adhering or sealing glass or plastics or metals which are less catalytically active (for example, zinc, cadmuim, high-alloyed steels and anodized aluminum), it is advantageous to pretreat these materials with metallic salt accelerators (for example copper naphthenate and colbalt napthenate).

Among the advantages of the adhesive and sealing compositions according to the present invention are the following. Elevated temperatures are not required for hardening. The parts joined together can after a short time already be subjected to heavy loading. In addition to ferrous materials, aluminum parts can also be cemented together with good strength. The thermal stability and flexibility of the cemented joint is excellent. The adhesives and sealing compositions according to the invention are particularly suitable for joining metals where great strength, and good thermal stability and flexibility of the cemented joint are required.

In the specification and claims, the terms "(meth)acrylate(s)" and "(meth)acrylic esters(s)" are used to designate esters of acrylic and esters of methacrylic acid. The esters of methacrylic acids are preferred. The esters are termed latent adhesives because they do not develop their adhesive properties until they have polymerized.

The invention is further described in the examples which follow. These examples are preferred embodiments of the invention and are not to be construed in limitation thereof.

TESTING METHODS

The anaerobically hardening compositions produced according to the following Examples 1-6, on subsequent pages 17 to 22 of this application, were subjected to the following tests:

A) STABILITY TEST:

In the stability test, test tubes of 10 cm length and 10 mm width were 9/10 filled with the mixtures according to Examples 1 to 8, and suspeneded in a bath kept at 80° C. The time interval from the suspension to the first formation of a gel was measured. All samples were still gel-free after 60 minutes.

B) TENSILE SHEARING STRENGTH:

The tensile shearing strength was measured (according to DIN 53283) using a tensile testing machine (feed = 20 mm/min) on steel plates (100 × 20 × 1.5 mm) which had been sand blasted at the place intended for the adhesive, and adhered to one another by means of the composition of the invention with a simple overlapping (DIN 1541/ST 1203) and on aluminum plates (DIN 1783, AlCuMg, 2 pl., 100 × 25 × 1.5 mm) which had been likewise adhered to one another with an overlapping length of 10 mm. The samples were tested as described above after hardening for 72 hours at room temperature.

C) THERMAL STABILITY:

In the thermal stability test a few drops of the anaerobically hardening adhesive were placed on the threads of a degreased bolt (M10x30DIN 933-8.8) and the appropriate nut (M10DIN 934-5.6) was screwed over the bolt. The cemented nut and bolt was allowed to harden for 3 days at room temperature and thereafter stored for 3 days in a drying oven at 150° C. The torque necessary to break the adhesive joint was then determined with a torque wrench.

D. FLEXIBILITY IN BENDING TEST:

For determining the flexibility of the samples a three-point bending test was used. Steel plates (DIN 1541 ST 1405, 100 × 20 × 0.88 mm) were adhered to one another by means of the composition of the invention with a simple overlap (2 cm$^2$) and, after hardening for 72 hours at room temperature, were bent in the center of the overlap over a mandrel (dia. 10 mm) until they broke. The angle at which the point came apart was measured. Such angle represents a measure of the flexibility of the cemented joint.

All the above tests were repeated 5 times. The mean values of the five measurements are given in the Examples which follow.

EXAMPLE 1

30 gm of an α, ω-bishydroxy-polycarbonate, prepared from diphenyl carbonate and triethylene glycol (mol. weight ∼1400), were reacted by ester exchange with 60 gm of methyl methacrylate in the presence of 15 gm of a commercial acid cation exchanger and 750 mgm of hydroquinone by distilling off the methanol-methyl methacrylate-azeotrope. During this reaction time the reaction mixture was maintained at the boiling point of the methyl methacrylate, and the ester was reintroduced to the reaction mixture after separation of the methanol. The dimethacrylic ester of the polycarbonate thus obtained was a colorless viscous liquid and is suitable for use as a component of anaerobically hardening adhesives.

Using the dimethacrylic ester of the polycarbonate obtained as above, an anaerobically hardening cement of the following composition was prepared:

60 gm of polycarbonate-dimethacrylic ester,
30 gm of polyethylene glycol-dimethacrylate, mol. weight ∼330
1 gm of p-toluene sulfonic acid hydrazide,
0.5 gm of N,N-dimethyl-p-toluidine,
5 gm of a 70% solution of cumene hydroperoxide in cumene,
0.5 gm of a 40% solution of peracetic acid in acetic acid,
3 gm of methacrylic acid.

This anaerobically hardening cement was tested in accordance with the above described Testing Methods B-D and the following mean values were obtained:

Tensile Shearing strength on Steel : 189 kp/cm$^2$
Tensile Shearing Strength on Aluminum : 110 kp/cm$^2$
Thermal Stability : 180 kp cm
Flexibility In Bending Test : 120 deg.

EXAMPLE 2

30 gm of an α, ω-bishydroxy-polycarbonate, prepared from diphenyl carbonate and triethylene glycol (mol. weight ∼700), were reacted by ester exchange with methyl methacrylate as described in Example 1.

Using the dimethacrylic ester of the polycarbonate obtained as above, an anaerobically hardening cement of the following composition was prepared:

60 gm of polycarbonate-dimethacrylic ester,
30 gm of hydroxyethyl methacrylate
1 gm of p-toluenesulfonic acid hydrazide,
0.5 gm of N,N-dimethyl-p-toluidine
5 gm of a 70% solution of cumene hydroperoxide in cumene,
0.5 gm of a 40% solution of peracetic acid in acetic acid,
3 gm of methacrylic acid.

This anaerobically hardening cement was tested in accordance with the above described Testing Methods B-D and the following mean values were obtained:

Tensile Shearing Strength on Steel : 207 kp/cm$^2$
Tensile Shearing Strength on Aluminum : 115 kp/cm$^2$
Thermal Stability : 200 kp cm
Flexibilty In Bending Test : 120 deg.

EXAMPLE 3

30 gm of an α, ω-bishydroxy-polycarbonate, prepared from diphenyl carbonate and a mixture of triethylene glycol and 1,4-dimethylol cyclohexane in a ratio of 2:1 (mol. weight ∼800), were reacted by ester exchange with methyl methacrylate as described in Example 1.

Using the dimethacrylic ester of the polycarbonate obtained as above, an anaerobically hardening cement of the following composition was prepared:

60 gm of polycarbonate-dimethacrylic ester
30 gm of polyethylene glycol dimethacrylate, mol. weight ∼330
1 gm of p-toluene sulfonic acid hydrazide
0.5 gm of N,N-dimethyl-p-toluidine
5 gm of a 70% solution of cumene hydroperoxide in cumene,
0.5 gm of a 40% solution of peracetic acid in acetic acid,
3 gm of methacrylic acid.

This anaerobically hardening cement was tested in accordance with the above described Testing Methods B-D and the following mean values were obtained:

Tensile Shearing Strength on Steel : 193 kp/cm$^2$
Tensile Shearing Strength on Aluminum : 105 kp/cm$^2$
Thermal Stability : 220 kp cm Flexibility In Bending Test : 120 deg.

EXAMPLE 4

30 gm of an α, ω-bishydroxy-polycarbonate, prepared from diphenyl carbonate and a mixture of triethylene glycol and neopentyl glycol in a ratio of 1:2 (mol. weight ~5000), were reacted by ester exchange with methyl methacrylate as in Example 1.

Using the dimethacrylic ester of the polycarbonate obtained as above, an anaerobically hardening cement of the following composition was prepared:

70 gm of polycarbonate-dimethacrylic ester
  20 gm of hydroxyethyl methacrylate,
  1 gm of p-toluenesulfonic acid hydrazide
  0.5 gm of N,N-dimethyl-p-toluidine
  5 gm of a 70% solution of cumene hydroperoxide in cumene
  0.5 gm of a 40% solution of peracetic acid in acetic acid,
  3 gm of methacrylic acid.

This anaerobically hardening cement was tested in accordance with the above described Testing Methods B-D and the following mean values were obtained:

Tensile Shearing Strength on Steel : 187 kp/cm$^2$
  Tensile Shearing Strength on Aluminum : 103 kp/cm$^2$
  Thermal Stability : 180 kp cm
  Flexibility In Bending Test : 110 deg.

EXAMPLE 5

30 gm of an α, ω-bishydroxy-polycarbonate, prepared from diphenyl carbonate and a mixture of triethylene glycol and neopentyl glycol in a ratio of 2:1 (mol. weight ~1000), were reacted by ester exchange with methyl methacrylate as in Example 1.

Using the dimethacrylic ester of the polycarbonate obtained as above, an anaerobically hardening cement of the following composition was prepared:

50 gm of polycarbonate-dimethacrylate
  40 gm of polyethyleneglycol dimethacrylate, mol. weight ~330,
  1 gm of p-toluenesulfonic acid hydrazide
  0.5 gm of N,N-dimethyl-p-toluidine
  5 gm of a 70% solution of cumene hydroperoxide in cumene
  0.5 gm of a 40% solution of peracetic acid in acetic acid
  3 gm of methacrylic acid.

This anaerobically hardening cement was tested in accordance with the above described Testing Methods B-D and the following mean values were obtained:

Tensile Shearing Stength on Steel : 227 kp/cm$^2$
  Tensile Shearing Strength on Aluminum : 122 kp/cm$^2$
  Thermal Stability : 240 kp cm
  Flexibility In Bending Test : 110 deg.

EXAMPLE 6

30 gm of an α, ω-bishydroxy-polycarbonate, prepared from diphenyl carbonate and a mixture of triethylene glycol and neopentyl glycol in a ratio of 1:1 (mol. weight ~7000), were reacted by ester exchange with methyl methacrylate as in Example 1.

Using the dimethacrylic ester of the polycarbonate obtained as above, an anaerobically hardening cement of the following composition was prepared:

70 gm of polycarbonate-dimethacrylate
  20 gm of tetrahydrofurfuryl methacrylate
  1 gm of p-toluenesulfonic acid hydrazide
  0.5 gm of N,N-dimethyl-p-toluidine
  5 gm of a 70% solution of cumene hydroperoxide in cumene
  0.5 gm of a 40% solution of peracetic acid in acetic acid,
  3 gm of methacrylic acid.

This anaerobically hardening cement was tested in accordance with the above described Testing Methods B-D and the following mean values were obtained:

Tensile Shearing Strength on Steel : 205 kp/cm$^2$
  Tensile Shearing Strength on Aluminum : 110 kp/cm$^2$
  Thermal Stability : 180 kp cm
  Flexibility In Bending Test : 120 deg.

We claim:

1. An anaerobically setting adhesive and sealing composition comprising
  A. a polymerizable portion consisting of (i) 10 to 90% by weight of (meth) acrylic acid esters of terminal hydroxy polycarbonates having at least two terminal hydroxyl groups, (ii) 10 to 40% by weight of cycloaliphatic, heterocyclic, or aliphatic (meth) acrylic acid esters, which are optionally substituted by free hydroxy groups, and (iii) optionally 0.1 to 5% by weight of additional polymerizable, unsaturated compounds,
  B. 0.1 to 20% by weight of organic hydroperoxides, and
  C. optionally 0.05 to 5.0% by weight of stabilizers and 0.1 to 5% by weight of accelerators.

2. The composition according to claim 1 wherein the (meth)acrylic acid esters of terminal hydroxy polycarbonates are derived from polycarbonates with terminal OH-groups, having a molecular weight between about 300 and 10,000.

3. The composition according to claim 1 wherein the (meth)acrylic acid esters of terminal hydroxy polycarbonates are derived from α,ω-bishydroxy polycarbonates.

4. The composition according to claim 1 which contains 10 to 40% by weight, based on the total weight of the polymerizable portions of the composition, of cycloaliphatic, heterocyclic, or aliphatic (meth)acrylic acid esters, which are optionally substituted by free hydroxy groups, and 60% – 90% by weight, based on the total weight of the polymerizable portions of the composition, of the other polymerizable portions of said composition.

5. The composition according to claim 4 which contains from 0.1 to 5% by weight, based on the total weight of the polymerizable portions of the composition, of a polymerizable carboxylic acid containing double bonds.

6. The composition according to claim 5 wherein the polymerizable carboxylic acid is selected from the group consisting of methacrylic acid and acrylic acid.

7. The composition according to claim 1 wherein the (meth)acrylic acid esters of terminal hydroxy polycarbonates contain diol-derived radicals from aliphatic, cycloaliphatic and/or oxyaliphatic diols.

8. The composition according to claim 1 which additionally contains 0.05 to 3.0% by weight, based on the total weight of the (meth)acrylic acid esters, of a stabilizer.

9. the composition according to claim 8 wherein the stabilizer is peracetic acid.

10. The composition according to claim 1 which additionally contains an accelerator or accelerators.

11. The composition according to claim 1 which addtionally contains an accelerator or accelerators and a stabilizer.

12. The composition according to claim 11 which contains p-toluenesulfonic acid hydrazide, N,N-dimethyl-p-toluidine and peracetic acid.

13. The composition according to claim 1 wherein the hydroperoxide is cumene hydroperoxide.

14. An assembly of metal surfaces bonded together by a content of an adhesive composition according to claim 1 in anaerobically cured state.

15. An assembly according to claim 14 wherein the metal surfaces are aluminum.

16. An assembly according to claim 14 wherein the metal surfaces are steel.

17. A method of forming a cemented bond by the polymerization of the anaerobically hardening adhesive and sealing composition according to claim 1 which acts as the bonding or sealing agent.

18. The composition according to claim 3 wherein component (A) consists of (i) 70 to 80% by weight of the (meth) acrylic acid esters of the terminal hydroxy polycarbonates, (ii) 20 to 30% by weight of cycloaliphatic, heterocyclic, or aliphatic mono (meth) acrylic acid esters, which are optionally substituted by free hydroxy groups, and (iii) optionally 0.1 to 5% by weight of additional polymerizable, unsaturated compounds.

19. The composition according to claim 3 wherein the (meth) acrylic acid esters of terminal hydroxy polycarbonates are derived from polycarbonates having a molecular weight between about 300 and 10,000.

20. The composition according to claim 19 wherein the (meth) acrylic acid esters of terminal hydroxy polycarbonates contain diol-derived radicals from a member selected from the group consisting of triethylene glycol, 1,4-dimethylol cyclohexane, neopentyl glycol, and mixtures thereof.

21. The composition according to claim 20 wherein
1. the (meth) acrylic acid esters of clause (ii) of component (A) are a member selected from the group consisting of polyethylene glycol dimethacrylate, hydroxyethyl methacrylate, tetrahydrofurfuryl methacrylate, and mixtures thereof,
2. the additional polymerizable, unsaturated compound of clause (iii) of component (A) is methacrylic acid,
3. the organic hydroperoxide of component (B) is cumene hydroperoxide,
4. the optional stabilizer of component (C) is peracetic acid, and
5. the optional accelerator of component (C) is a member selected from the group consisting of p-toluenesulfonic acid hydrazide, N,N-dimethyl-p-toluidine, and mixtures thereof.

* * * * *